(12) United States Patent
Assem Aly Salama et al.

(10) Patent No.: US 11,962,467 B2
(45) Date of Patent: Apr. 16, 2024

(54) MANAGING HETEROGENEOUS CLUSTER ENVIRONMENT

(71) Applicants: International Business Machines Corporation, Armonk, NY (US); UNIVERSITY COLLEGE DUBLIN, Dublin (IE)

(72) Inventors: Hitham Ahmed Assem Aly Salama, Dublin (IE); Teodora Sandra Buda, Dublin (IE); Patrick J. O'Sullivan, Dublin (IE); Philip Perry, Dublin (IE); Lei Xu, Dublin (IE)

(73) Assignees: International Business Machines Corporation, Armonk, NY (US); UNIVERSITY COLLEGE DUBLIN, Dublin (IE)

( * ) Notice: Subject to any disclaimer, the term of this patent is extended or adjusted under 35 U.S.C. 154(b) by 395 days.

(21) Appl. No.: 15/676,334

(22) Filed: Aug. 14, 2017

(65) Prior Publication Data
US 2019/0052534 A1 Feb. 14, 2019

(51) Int. Cl.
*H04L 41/12* (2022.01)
*H04L 41/08* (2022.01)
(Continued)

(52) U.S. Cl.
CPC .......... *H04L 41/12* (2013.01); *H04L 41/0816* (2013.01); *H04L 41/0886* (2013.01);
(Continued)

(58) Field of Classification Search
CPC . H04L 41/12; H04L 67/1076; H04L 67/1095; H04L 67/1097; H04L 67/1031;
(Continued)

(56) References Cited

U.S. PATENT DOCUMENTS 7,213,010 B2  5/2007  Estrada et al.
7,890,626 B1  2/2011  Gadir
(Continued)

OTHER PUBLICATIONS

Iglesias, Jesus Omana, et al. "A cost-capacity analysis for assessing the efficiency of heterogeneous computing assets In an enterprise cloud." Proceedings of the 2013 IEEE/ACM 6th International Conference on Utility and Cloud Computing. IEEE Computer Society, 2013, pp. 107-114.
(Continued)

*Primary Examiner* — Nicholas R Taylor
*Assistant Examiner* — Tania M Pena-Santana
(74) *Attorney, Agent, or Firm* — Samuel Waldbaum; Otterstedt & Kammer PLLC

(57) ABSTRACT

An embodiment includes a method for use in managing a cluster comprising a plurality of computers, each computer comprising at least one hardware processor coupled to at least one memory. The method comprises a computer-implemented manager: collecting access pattern data for the plurality of computers; based at least in part on the access pattern data, determining that at least a first one of the plurality of computers is overutilized; and responsive to determining that the first computer is overutilized, moving stored data from the first computer to at least a second one of the plurality of computers.

19 Claims, 3 Drawing Sheets

(51) Int. Cl.
  *H04L 41/0816* (2022.01)
  *H04L 41/5003* (2022.01)
  *H04L 43/0876* (2022.01)
  *H04L 67/1029* (2022.01)
  *H04L 67/1031* (2022.01)
  *H04L 67/1074* (2022.01)
  *H04L 67/1095* (2022.01)
  *H04L 67/1097* (2022.01)
  *H04L 67/54* (2022.01)

(52) U.S. Cl.
  CPC ...... *H04L 43/0876* (2013.01); *H04L 67/1029* (2013.01); *H04L 67/1031* (2013.01); *H04L 67/1076* (2013.01); *H04L 67/1095* (2013.01); *H04L 67/1097* (2013.01); *H04L 67/54* (2022.05); *H04L 41/5003* (2013.01)

(58) Field of Classification Search
  CPC ............. H04L 41/0816; H04L 67/1029; H04L 41/0886; H04L 67/24; H04L 43/0876; H04L 41/5003
  See application file for complete search history.

(56) References Cited

U.S. PATENT DOCUMENTS

| | | | |
|---|---|---|---|
| 7,941,401 B2 | 5/2011 | Okamoto | |
| 8,321,454 B2 | 11/2012 | Berlyant et al. | |
| 8,577,853 B2 | 11/2013 | Li et al. | |
| 8,832,234 B1* | 9/2014 | Brooker | H04L 67/1097 709/219 |
| 8,935,651 B1 | 1/2015 | Ku et al. | |
| 9,250,808 B2 | 2/2016 | Fuente et al. | |
| 9,451,012 B1* | 9/2016 | Neill | H04L 12/46 |
| 10,061,525 B1* | 8/2018 | Martin | G06F 3/061 |
| 10,216,770 B1* | 2/2019 | Kulesza | G06F 9/5072 |
| 2003/0079100 A1* | 4/2003 | Williams | G06F 11/1435 711/165 |
| 2005/0149540 A1* | 7/2005 | Chan | G06F 16/27 |
| 2006/0031287 A1* | 2/2006 | Ulrich | G06F 9/5083 709/203 |
| 2007/0050497 A1* | 3/2007 | Haley | H04L 43/0817 709/224 |
| 2007/0088703 A1* | 4/2007 | Kasiolas | G06Q 40/04 |
| 2009/0022090 A1* | 1/2009 | Ayoub | H04W 40/04 370/328 |
| 2012/0179723 A1* | 7/2012 | Lin | G06F 11/2094 707/792 |
| 2014/0149590 A1* | 5/2014 | Mallipeddi | G06F 9/5061 709/226 |
| 2015/0106578 A1 | 4/2015 | Warfield et al. | |
| 2018/0067775 A1* | 3/2018 | Frandzel | G06F 9/505 |

OTHER PUBLICATIONS

Gartner IT Glossary, Total Cost of Ownership (TCO), downloaded Aug. 14, 2017 from http://www.gartner.com/it-glossary/total-cost-of-ownership-tco/, p. 1 of 1.

Martin Perlin, Downtime, Outages and Failures—Understanding Their True Costs, downloaded Aug. 14, 2017 from http://www.evolven.com/blog/downtime-outages-and-failures-understanding-their-true-costs.html, pp. 1-8, Evolven Blog, originally dated Sep. 17, 2012.

Xiao, Zhen, Weijia Song, and Qi Chen. "Dynamic resource allocation using virtual machines for cloud computing environment." IEEE transactions on parallel and distributed systems 24.6 (2013): 1107-1117.

Hadoop Wiki, JobTracker, downloaded Aug. 14, 2017 from https://wiki.apache.org/hadoop/JobTracker, p. 1 of 1.

Cisco, Data Center Architecture Overview, downloaded Aug. 14, 2017 from https://www.cisco.com/c/en/us/td/docs/solutions/Enterprise/Data_Center/DC_Infra2_5/DCInfra_1.pdf, pp. 1-1 through 1-10.

* cited by examiner

200

300

MANAGING HETEROGENEOUS CLUSTER ENVIRONMENT

BACKGROUND

The present invention relates to the electrical, electronic and computer arts, and, more particularly, to management of one or more computer systems.

A data center represents a purpose-built facility composed of thousands of servers, providing storage and computing services within and across organizational boundaries. Data centers are typically designed to provide enough compute and storage capabilities to accommodate the peak load expected. This inherently means that at other times, the resources within the data center are underutilized, with an average utilization of between 6% and 20%. Since the cost of building a data center is extremely large, such low utilization significantly erodes the expected return on investment. Similarly, increasing energy and operational costs will erode profit margins or increase the costs to the end-users. It is therefore imperative that utilization should be maximized through intelligent use of the resources.

One approach to this problem is to consolidate the workload in a minimum amount of machines such that these are highly utilized, and the idle machines can be powered down, as idle servers consume between 50% and 60% of their peak power. However, with this approach there are higher chances of interference between the workloads that are collocated in the same server.

Another approach is to balance the compute workload across the available machines such that it is evenly spread with the probability of performance degradations is reduced. The load-balancing approach is typically used in latency-sensitive environments, such as web search and other interactive applications. It is also used in telecommunications applications, where service level agreements (SLA's) are particularly demanding (e.g., the five 9s: "99.999" availability).

There are several strategies that can be adopted for data placement in a distributed computing environment: (i) randomly, (ii) alphabetically, (iii) based on location, (iv) based on hashing, etc. In a homogeneous cluster, a typical data placement algorithm would split the data into equal chunks and distribute them evenly to all nodes of the cluster. Another strategy, which is adopted by Hadoop, is to distribute the data across the nodes based on disk space availability on each node. Such data placement strategy is very practical and efficient for a homogeneous environment where nodes are identical in terms of both computing and disk capacity.

However, these strategies are inefficient in a heterogeneous cluster, where nodes have different processing capabilities. High-performance nodes finish the execution of jobs faster than a low-performance node, which triggers data transfers from slower nodes to faster nodes. This can severely impact the performance of the cluster to process jobs, as transferring data across nodes can be highly expensive in terms of time and network utilization.

One strategy for data placement in a heterogeneous environment is to place data according to the computation power of the nodes, i.e., the file fragments placed on the disk of each node is proportional to the node's data processing speed. This ensures that the high-performance nodes process more data than low-performance nodes, and thus reduces the amounts of data that must be transferred across the network between the nodes. However, conventional approaches typically only redistribute the data when (i) nodes are added to the cluster environment, (ii) nodes are removed from the cluster environment, or (iii) data is appended to an existing input file.

SUMMARY

An embodiment includes a method for use in managing a cluster comprising a plurality of computers, each computer comprising at least one hardware processor coupled to at least one memory. The method comprises a computer-implemented manager: collecting access pattern data for the plurality of computers; based at least in part on the access pattern data, determining that at least a first one of the plurality of computers is overutilized; and responsive to determining that the first computer is overutilized, moving stored data from the first computer to at least a second one of the plurality of computers.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. Embodiments of the invention advantageously reduce the total cost or ownership while maintaining a desired performance level. Embodiments of the invention can provide higher utilization levels for each node across the cluster: inefficient nodes can become efficient by ensuring that data is partitioned correctly across the cluster. Embodiments of the invention can optimize application performance by reducing the time needed for each node to process data. Embodiments of the invention provide improved data locality and reduced network bandwidth consumption: once the data is distributed efficiently, fewer data transfers are needed between the nodes.

These and other features and advantages of the present invention will become apparent from the following detailed description of illustrative embodiments thereof, which is to be read in connection with the accompanying drawings.

DETAILED DESCRIPTION

Illustrative embodiments of the present invention advantageously balance the most accessed data across the available machines, such that each machine is evenly utilized. As used herein, "utilization" may consider resources including, but not limited to, memory, CPU, disk etc. An embodiment of the present invention builds on the benefits of adaptive distribution of data across nodes in a heterogeneous cluster environment according to the access patterns of each node. The reason for this is that certain data might be accessed more by the workloads. In that case, the node storing that data can become overutilized, which might result in performance degradations, leading to the node being slow and inefficient.

This inefficiency can be solved by automatically rebalancing the data in the cluster based on the nodes' access patterns. Highly utilized nodes could contain data that is very popular and that should be split such that each node has similar access patterns in order to avoid performance degradations. Once a balanced utilization is achieved, it means that data is partitioned in an efficient manner.

In contrast to conventional techniques which place frequently-accessed ("hot" or "popular") data on high-performance storage, illustrative embodiments of the present invention splits this "hot" data across different nodes in order to ensure a balanced utilization across the entire cluster. In turn, this leads to more efficient resource utilization and also improves throughput/latency. In particular, illustrative embodiments of the present invention distributes the most popular data across underutilized nodes in order to ensure an even distribution of data.

An illustrative embodiment of the present invention periodically checks for inefficient utilization levels and performance degradations due to a node being over utilized due to popular data. When this occurs, data is automatically rebalanced to ensure the efficiency of the cluster. The embodiment rebalances the data across the nodes based on their access patterns. Most popular data is distributed across underutilized nodes in order to ensure an even distribution of data and to improve the efficiency of overutilized nodes. This leads to a balanced utilization level across the entire cluster, such that there is less chances of performance degradations. This approach is particularly suitable for use in latency-sensitive environments, such as web search and telecommunications where SLA's are really demanding (e.g., the five 9s: "99.999" availability). An illustrative embodiment of the present invention can extend load balancing of compute resources to include automatic data balancing of storage resources.

Figure 1A:
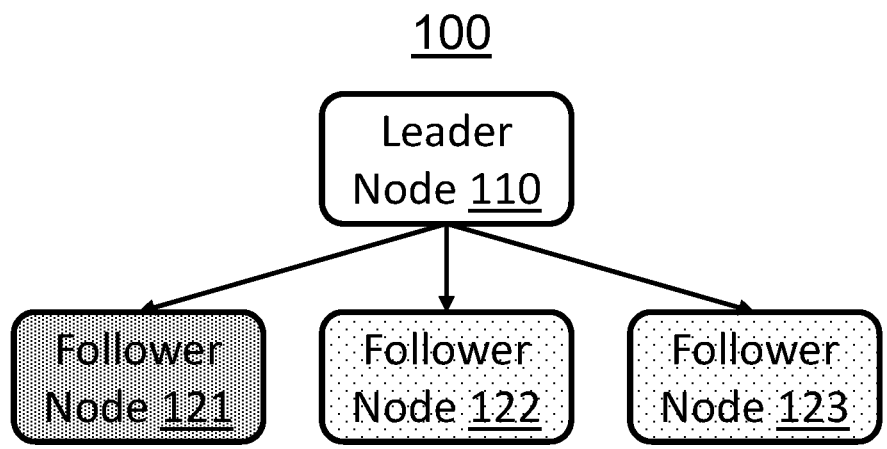
FIGS. 1A and 1B both show a cluster suitable for use with an illustrative embodiment of the present invention.
Figure 1B:
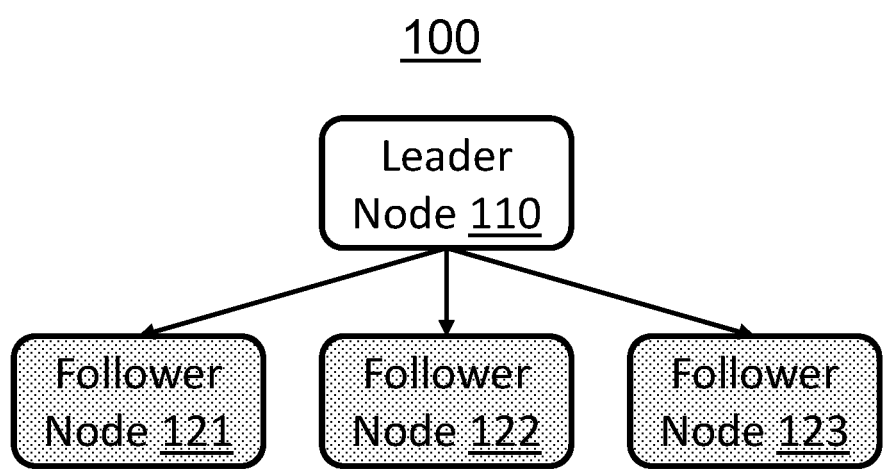

FIGS. 1A and 1B both show a cluster 100 with a leader node 110 and three follower nodes 121, 122, and 123. In FIG. 1A, cluster 100 is unbalanced: follower node 121 is overutilized, as indicated by its dark stippling, which may result in performance degradation. Conversely, follower nodes 122 and 123 are underutilized, as indicated by their light stippling, which means that they are not being utilized efficiently.

Leader node 110 detects this unbalanced condition and rebalances the nodes by transferring data (typically frequently-accessed data) from an overutilized follower node (e.g. 121) to one or more underutilized follower nodes (e.g. 122 and 123). FIG. 1B shows cluster 100 after rebalancing in accordance with an embodiment of the present invention. Follower nodes 121, 122 and 123 each has a balanced utilization, as indicated by their moderate stippling.

Data which was stored on a single (usually overutilized) node may be advantageously split between a plurality of nodes, thereby distributing the load associated with requests to access that data. This may involve transferring frequently-accessed data from overutilized node 121 to underutilized nodes 122 and 123, such that the data is split between nodes 122 and 123 rather than being stored entirely on node 121. This may also involve transferring only a portion of the data from overutilized node 121 to another node (e.g., underutilized node 122), such that the data previously stored entirely on node 121 is instead split between nodes 121 and 122. These techniques could be combined, with a portion of the data being retained on node 121, and with other portions of the data being transferred to underutilized nodes 122 and 123, respectively, such that the data is split between nodes 121, 122, and 123. While FIGS. 1A and 1B show data being transferred from an overutilized node to underutilized nodes, embodiments may more generally include transferring data from a more utilized node to one or more less utilized nodes.

Figure 2:
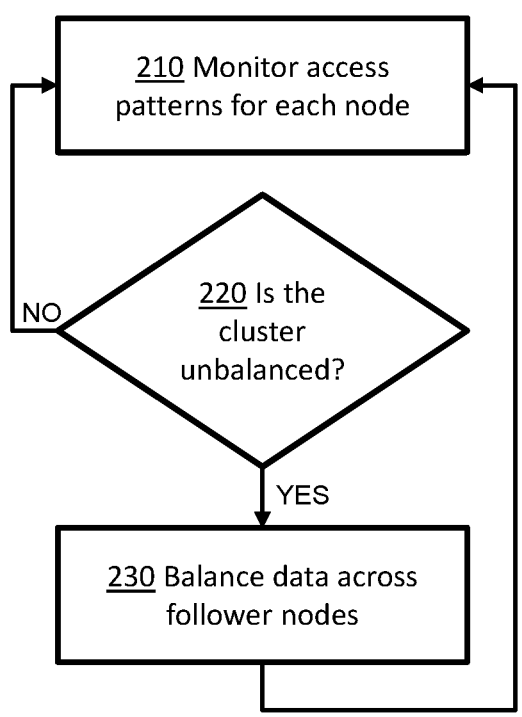
FIG. 2 is a simplified flowchart showing one or more aspects of an illustrative embodiment of the present invention.

FIG. 2 is a simplified flowchart showing one or more aspects of an illustrative embodiment of the present invention. FIG. 2 shows a process 200 suitable for execution by a leader node in a cluster (e.g., node 110 in cluster 100 in FIG. 1). The process begins in step 210 with monitoring the access patterns of each node. In some embodiments, a leader node (e.g., 110) monitors the access patterns of follower nodes (e.g., 121, 122, 123).

Step 220 involves periodically and/or continuously checking to see if the cluster is unbalanced. This could involve analysis of historical access pattern data collected in step 210. This could additionally or alternatively involve detecting performance degradation of an overutilized node. If step 220 determines that the cluster is balanced, the process returns to step 210 and continues monitoring access patterns.

If step 220 determines that the cluster is unbalanced, the process goes to step 230, which involves balancing data across the nodes. As previously discussed, this typically involves moving data from an overutilized node to one or more underutilized nodes, and may include splitting data from a single node between multiple nodes. The decision of which data to move, and the nodes between which it should be moved, can be informed by the access pattern data collected in step 210. For example, it may be desirable to transfer frequently-accessed data from an overutilized node to one or more underutilized nodes. In some embodiments, the cluster may be heterogeneous, such that different nodes have different capabilities in terms of, e.g., central processing unit (CPU) speed, random access memory (RAM), hard disk access speed, cache size, etc. The automatic data balancing algorithm preferably takes account of these different capabilities.

After step 230, the process returns to step 210 to resume monitoring access patterns. In addition to detecting unbalanced conditions as discussed above, this monitoring can also evidence the improved efficiency of the cluster due to the rebalancing.

Given the discussion thus far, it will be appreciated that, in general terms, an aspect of the invention includes a method for use in managing a cluster comprising a plurality of computers, each computer comprising at least one hardware processor coupled to at least one memory. The method comprises a computer-implemented manager: collecting access pattern data for the plurality of computers; based at least in part on the access pattern data, determining that at least a first one of the plurality of computers is overutilized; and responsive to determining that the first computer is overutilized, moving stored data from the first computer to at least a second one of the plurality of computers.

One or more embodiments of the invention, or elements thereof, can be implemented, at least in part, in the form of an apparatus including a memory and at least one processor that is coupled to the memory and operative to perform exemplary method steps.

Figure 3:
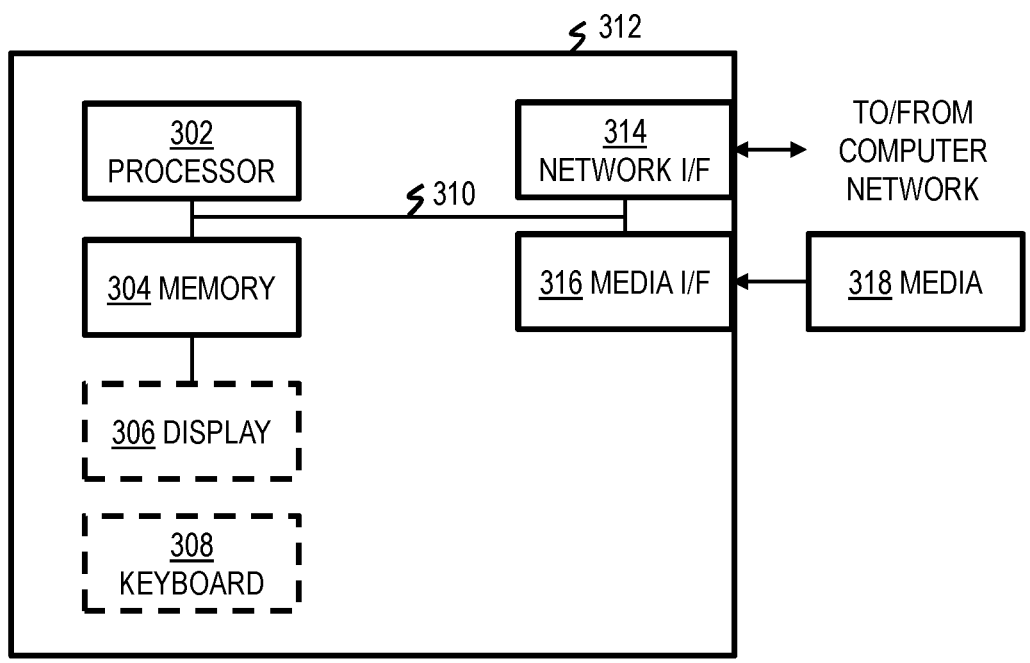
FIG. 3 depicts a computer system that may be useful in implementing one or more aspects and/or elements of the invention.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 302. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for use in managing a cluster comprising a plurality of computers, each computer comprising at least one hardware processor coupled to at least one memory, the plurality of computers within the cluster comprising a leader node and a plurality of follower nodes, the method comprising:

the leader node of the cluster collecting access pattern data for the plurality of follower nodes within the cluster;

based at least in part on the access pattern data, the leader node of the cluster determining that at least a first one of the plurality of follower nodes within the cluster is overutilized by analyzing a historical access pattern; and responsive to determining that the first follower node is overutilized, selecting a subset of data stored at the first follower node to move based on a determination that the subset of data is frequently accessed and the leader node of the cluster moving the selected subset of data stored on the first follower node to at least a second one of the plurality of follower nodes within the cluster to configure the first follower node and the second follower node to be subjected to similar access patterns.

2. The method of claim 1, wherein determining that at least a first one of the plurality of follower nodes is overutilized comprises comparing the access pattern data to a capability of at least the first follower node.

3. The method of claim 1, wherein determining that at least a first one of the plurality of follower nodes is overutilized comprises detecting performance degradation of at least the first follower node.

4. The method of claim 1, wherein the at least second follower node is selected based at least in part on a determination that the at least second follower node is underutilized.

5. The method of claim 4, wherein the determination that the at least second follower node is underutilized is based at least in part on the access pattern data.

6. The method of claim 5, wherein determining that at least a second one of the plurality of follower nodes is underutilized comprises comparing the access pattern data to a capability of at least the second follower node.

7. The method of claim 4, wherein at least one of the determination that the first follower node is overutilized and the determination that the second follower node is underutilized is based at least in part on relative capabilities of at least the first and second follower nodes.

8. The method of claim 1, wherein moving the stored subset of data comprises splitting the stored subset of data between the first follower node and at least the second follower node.

9. The method of claim 8, wherein splitting the stored subset of data between the first follower node and at least the second follower node comprises moving a portion of the stored data to the second follower node while retaining another portion of the stored data on the first follower node.

10. The method of claim 1, wherein moving the stored subset of data from the first follower node to at least a second one of the plurality of follower nodes comprises splitting the subset of data between the second follower node and at least a third one of the plurality of computers.

11. The method of claim 10, wherein splitting the stored subset of data comprises moving respective portions of the stored subset of data to at least the second and third follower nodes.

12. The method of claim 10, wherein splitting the stored subset of data comprises moving respective portions of the stored subset of data to at least the second and third follower nodes while retaining another portion of the stored subset of data on the first follower node.

13. The method of claim 10, wherein the second and third follower nodes are selected based at least in part on a determination that at least the second and third follower nodes are underutilized.

14. The method of claim 13, wherein the determination that at least the second and third follower nodes are underutilized is based at least in part on the access pattern data.

15. The method of claim 1, wherein the cluster is heterogeneous and where the selection of the subset of data is based on different capabilities of the nodes.

16. A leader node within a cluster of computers, the cluster of computers further comprising a plurality of follower nodes, each follower node comprising at least one hardware processor coupled to at least one memory, the leader node comprising:

a memory; and
at least one processor coupled with the memory, the processor operative:
 to collect access pattern data for the plurality of follower nodes within the cluster;
 based at least in part on the access pattern data, to determine that at least a first one of the plurality of follower nodes within the cluster is overutilized by analyzing a historical access pattern; and
 responsive to determining that the first follower node is overutilized, selecting a subset of data stored at the first follower node to move based on a determination that the subset of data is frequently accessed and the leader node of the cluster moving the subset of data stored on the first follower node to at least a second one of the plurality of follower nodes within the cluster to configure the first follower node and the second follower node to be subjected to similar access patterns.

17. The leader node of claim 16, wherein the cluster is heterogenous and where the selection of the subset of data is based on different capabilities of the nodes.

18. A cluster of computers comprising:
a leader node comprising at least one hardware processor coupled to at least one memory; and
a plurality of follower nodes, each follower node comprising at least one hardware processor coupled to at least one memory;
the leader node of the cluster being operative to collect access pattern data for the plurality of follower nodes within the cluster;
based at least in part on the access pattern data, the leader node of the cluster being operative to determine that at least a first one of the plurality of follower nodes within the cluster is overutilized by analyzing a historical access pattern; and
responsive to determining that the first follower node is overutilized, selecting a subset of data stored at the first follower node to move based on a determination that the subset of data is frequently accessed and the leader node of the cluster moving the subset of data stored on the first follower node to at least a second one of the plurality of follower nodes within the cluster to configure the first follower node and the second follower node to be subjected to similar access patterns.

19. The cluster of claim 18, wherein the cluster is heterogeneous and where the selection of the subset of data is based on different capabilities of the nodes.

* * * * *